United States Patent
Park (10) Patent No.: US 7,497,576 B2
(45) Date of Patent: *Mar. 3, 2009

(54) PROJECTION DISPLAY

(75) Inventor: Jong Myoung Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 287 days.

This patent is subject to a terminal disclaimer.

(21) Appl. No.: 11/159,332

(22) Filed: Jun. 23, 2005

(65) Prior Publication Data

US 2005/0286022 A1    Dec. 29, 2005

(30) Foreign Application Priority Data

Jun. 24, 2004    (KR) .................... 10-2004-0047566

(51) Int. Cl.
*G03B 21/14* (2006.01)
*G03B 21/26* (2006.01)

(52) U.S. Cl. .............................. 353/20; 353/31; 353/37

(58) Field of Classification Search .................... 353/20, 353/31, 84, 97, 122; 349/9, 57, 62; 348/761, 348/762, 766, 767

See application file for complete search history.

(56) References Cited

U.S. PATENT DOCUMENTS

| | | | | |
|---|---|---|---|---|
| 5,822,021 | A  * | 10/1998 | Johnson et al. | 348/742 |
| 6,536,903 | B2 * | 3/2003  | Bone           | 353/31  |
| 2002/0085180 | A1 * | 7/2002 | Lee         | 353/84  |
| 2004/0057019 | A1 * | 3/2004 | Sokolov     | 353/31  |
| 2005/0286021 | A1 * | 12/2005 | Park        | 353/20  |
| 2006/0092380 | A1 * | 5/2006 | Salsman et al. | 353/20 |

* cited by examiner

*Primary Examiner*—Hung Henry Nguyen
(74) *Attorney, Agent, or Firm*—Birch, Stewart, Kolasch & Birch, LLP (57) ABSTRACT

A projection display is disclosed. The present invention can eliminate the reflective light on the internal optical surface of the optical system, using the phase plate and linear polarizer, in the color sequential driving of illuminating at least two colors on the single display panel at a random moment. The phase plate converts the incident light from a linearly polarized light to a circularly polarized light, and vice versa. And, the linear polarizer transmits the linearly polarized light of the incident light in the specific direction. Therefore, the present invention prevents the degradation of color purity generated from the mutual intrusion of light of at least two colors, thereby enhancing quality of color image.

19 Claims, 5 Drawing Sheets

LCoS

FIG. 5

PROJECTION DISPLAY

This application claims the benefit of the Korean Patent Application No. 10-2004-0047566, filed on Jun. 24, 2004, which is hereby incorporated by reference as if fully set forth herein.

BACKGROUND OF THE INVENTION

1. Field of the Invention

The present invention relates to a projection display. Although the present invention is suitable for a wide scope of applications, it is particularly suitable for enhancing color purity.

2. Discussion of the Related Art

Recently, a display device has a tendency for developing into its lightweight, slim size and wide screen, and more particularly, its lightweight and slim size become a matter of concern.

To achieve the light weight and slim size, a projection display instrument needs to employ a single panel illumination system using one display panel instead of employing a 3- or 2-panels illumination system using three display panels.

The single panel illumination system enables low price, lightweight and slim size which are smaller than those of the 3-panels illumination system. Yet, the single panel illumination system implements separation/synthesis of the three primary colors, red, blue and green of light by color sequential driving, thereby having radiation intensity lower than that of the 3-panels illumination system.

To supplement such a disadvantage of the single panel illumination system, color scrolling methods of implementing color by illuminating at least two kinds of color on a display panel instantly have been devised.

Yet, in the color scrolling type single panel projection display, at least two colors are simultaneously illuminated on one panel to implement colors. Hence, one color causes interference to an area of another color on the display panel to lower color purity.

For instance, blue and green lights intrude a red area to degrade red color purity. Likewise, a green or blue area is intruded by lights of the rest two colors to degrade its color purity. Such a color purity degradation always takes place in the color implementation system of the color scrolling method of implementing lights of at least two colors on one display panel simultaneously.

Figure 1:
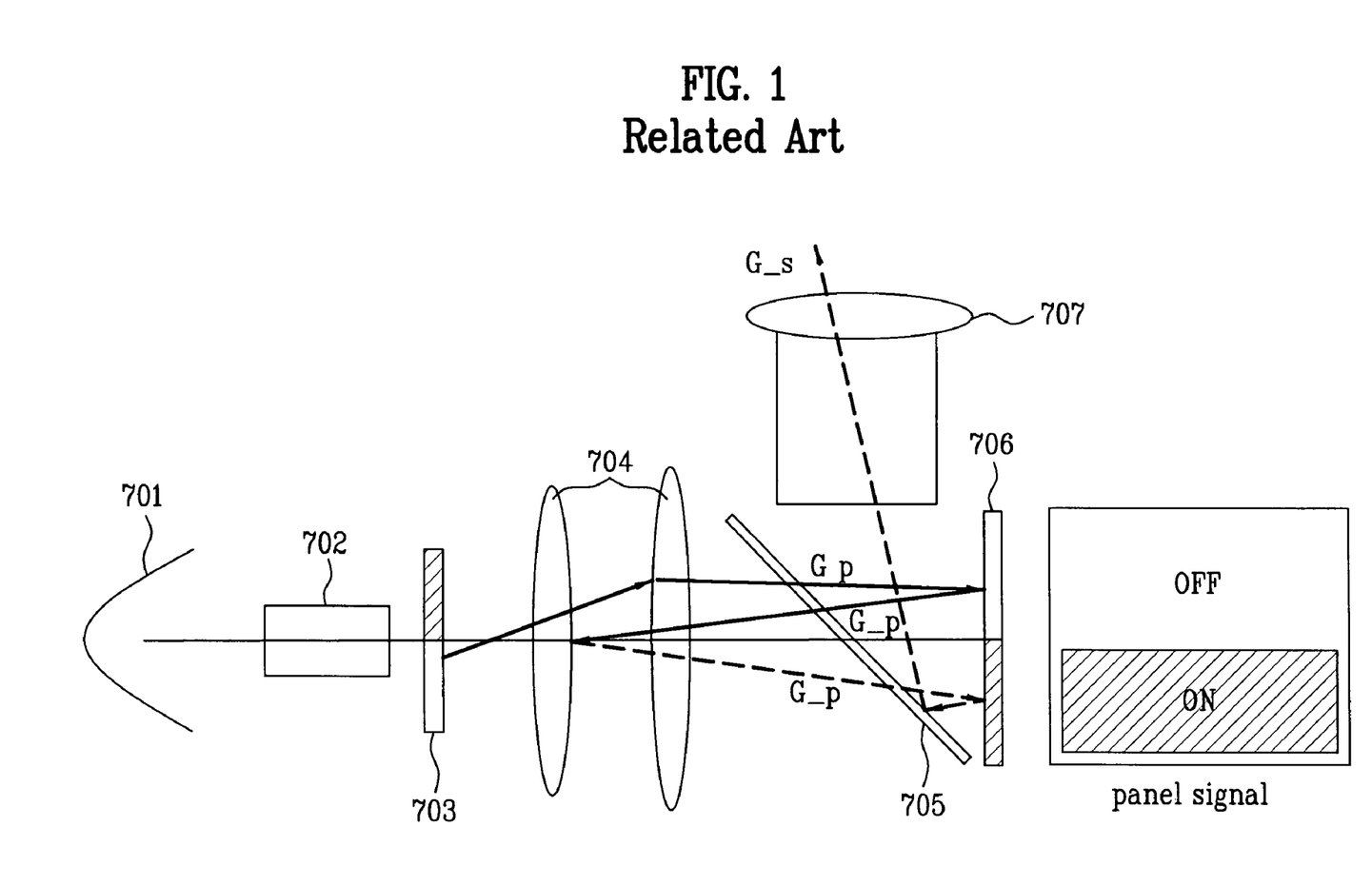
FIG. 1 is a diagram for explaining an example of occurrence of color intrusion at a random moment in case of implementing an entire screen with red in an illumination system of a single panel projection display device according to a related art.
Figure 2:
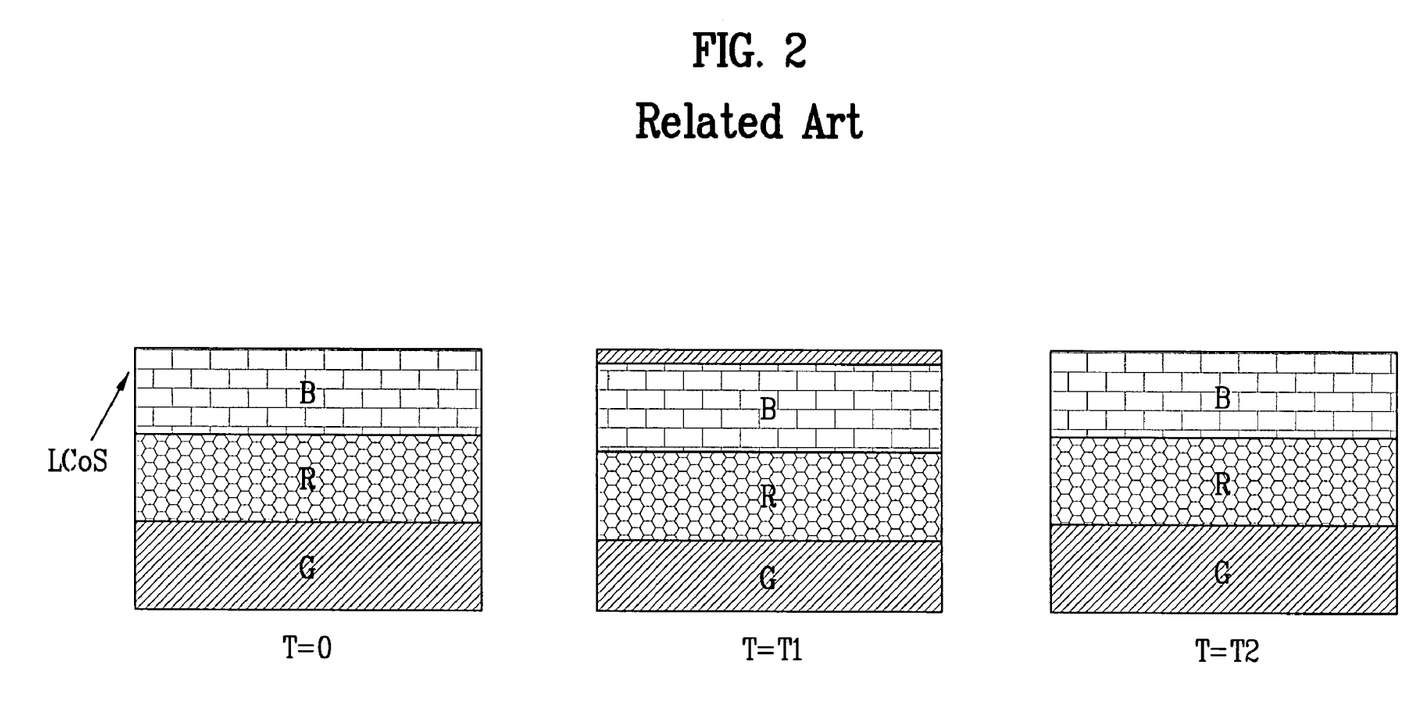
FIG. 2 is a diagram for explaining a color scrolling method by the rotating prism in a single panel projection display device according to a related art.
Figure 3:
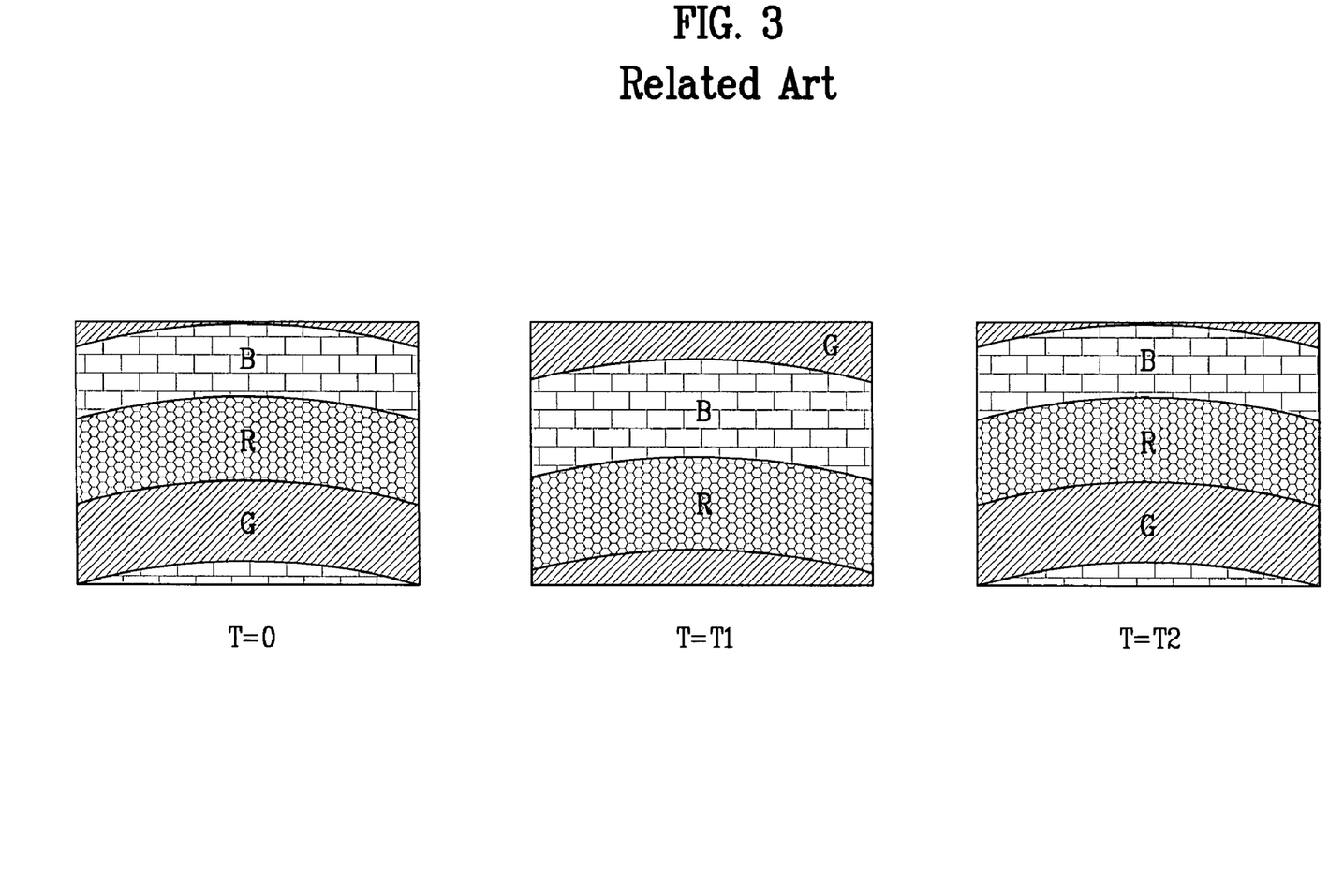
FIG. 3 is a diagram for explaining a color scrolling method by the color wheel in a single panel projection display device according to a related art.

FIG. 1 is a diagram for explaining an example of occurrence of color intrusion at a random moment in case of implementing an entire screen with red in an illumination system of a single panel projection display device according to a related art, FIG. 2 is a diagram for explaining a color scrolling method by the rotating prism in a single panel projection display device according to a related art, and FIG. 3 is a diagram for explaining a color scrolling method by the color wheel in a single panel projection display device according to a related art.

A process that 1-color light intrudes an area of another color is explained with reference to FIG. 1 as follows.

FIG. 1 shows an example that green color intrudes red color in a color scrolling method of illuminating 2-color light on a panel at one arbitrary moment.

Referring to FIG. 1, white light projected from a light source 701 is homogenized and converted to a linearly polarized light having one optical axis by an integrator and polarizing converter 702 to proceed to a color separation unit 703. Any device operative in performing color separation by a color scrolling method can be used as the color separation unit 703. For instance, a color drum, a color wheel, a rotating prism or the like corresponds to the color separation unit 703. Namely, the color separation unit 703 splits the white light into lights of R, G and B areas. And, it is also assumed that the polarizing converter 202 converts the white light to a P-wave polarized light.

The R, G and B lights split by the color separation unit 703 are sequentially illuminated on a display panel 706 via an illumination lens array 704 and a PBS 705.

In FIG. 1 that shows an example of implementing an entire image by red color, an ON signal is applied to an area of the display panel having the red light illuminated thereon and an OFF signal is applied to an area of the panel having the green and blue lights applied thereto, in the color scrolling method. According to a time basis, the R, G and B lights, as shown in FIG. 2 and FIG. 3, then sequentially propagate. In doing so, the red light proceeds to a projection lens 707 via a PBS 705 only but the green and blue lights fail in proceeding toward the projection lens 707.

Namely, as the P-polarized red light is illuminated on the ON area of the display panel only, a polarized direction of the red light is converted to an S-wave from a P-wave to reflect to the PBS 705.

It is assumed that the PBS 705 is coated with a polarizing film to reflect the S-wave thereon and to transmit the P-wave therethrough.

If so, the S-wave red light is reflected by the PBS 705 toward the projection lens 707. The projection lens 707 then enlarges and projects the red light reflected by the PBS 705 to a screen (not shown in the drawing).

Meanwhile, the P-polarized green and blue lights, which are illuminated on the OFF area of the display panel, are reflected toward the PBS 705 without changing their polarized direction. Namely, the green and blue lights maintaining the P-polarization to be reflected toward the PBS 705.

For convenience of explanation, the green light among the green and blue lights is explained in detail as follows.

First of all, the green light, which is reflected by the OFF area of the display panel 706 to the PBS 705 to be in the P-polarized state $G\_p$, is transmitted through the PBS 705 to enter the illumination lens array 704 as it is.

In doing so, it may happen that a portion $G\_p$ of the green light indicated by a dotted line in FIG. 1 is reflected by a random surface of the illumination lens array 704 to arrive at the red area of the display panel via the PBS 705. Since the panel signal of the red area is 'ON', the P-polarized green light $G\_p$ is converted to the green light $G\_s$ to reflect to the PBS 705. Since the PBS 705 is coated to reflect the S-polarized light, the S-polarized green light $G\_s$ is reflected by the PBS 705 to the projection lens 707. The projection lens 707 then enlarges to project the S-polarized green light to the red area of the screen.

Meanwhile, the blue light, on which the same process of the green light is carried out, is enlarged to be projected on the red area of the screen as well.

However, in case of the related art single panel projection display device enabling color implementation by illuminating at least two kinds of lights on the display panel simultaneously, the above-explained color intrusion degrades the quality of color image.

SUMMARY OF THE INVENTION

Accordingly, the present invention is directed to a projection display that substantially obviates one or more problems due to limitations and disadvantages of the related art.

An object of the present invention is to provide a projection display, in which color intrusion is prevented in case of color implementation by simultaneously illuminating at least two kinds of colors on one display panel and by which a color purity degradation is prevented.

Another object of the present invention is to provide a projection display, in which internal reflection occurring in an inner optical surface of an optical system is eliminated and by which a simple configuration and excellent image quality can be provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a projection display according to the present invention includes a light source generating a light, a color separation unit splitting the light into R, G and B lights, an illumination lens array condensing the respective R, G and B lights, a display panel implementing an image corresponding to the incident R, G and B lights respectively, a phase plate provided to at least one of one portion between the color separation unit and the illumination lens array and the other portion between the illumination lens array and the display panel to convert a polarized form of an incident light, and a linear polarizer provided between the phase plate and the display panel to transit a specific-directional linearly polarized light of the incident light converted by the phase plate.

Preferably, the color separation unit includes one selected from the group consisting of a color drum, a color wheel and a rotational prism.

Preferably, the phase plate includes a λ/4 plate that converts the incident light to a circularly polarized light if the incident light is a linearly polarized light or to the linearly polarized light if the incident light is the circularly polarized light.

Preferably, the phase plate provided between the color separation unit and the illumination lens arrays converts the incident light to a right-hand circularly polarized light if the incident light is an S-wave linearly polarized light or to a left-hand circular if the incident light is a P-wave linearly polarized light. Preferably, the phase plate provided between the illumination lens array and the display panel converts the incident light to a right-hand circularly polarized light if the incident light is a P-wave linearly polarized light or to a left-hand circularly polarized light if the incident light is an S-wave linearly polarized light.

Preferably, the linear polarizer includes a P-wave polarizer that transmits the incident light if the incident light is a P-wave linearly polarized light or cuts off the incident light if the incident light is an S-wave linearly polarized light.

Preferably, the phase plate provided between the color separation unit and the illumination lens array is arranged parallel or vertical to the other phase plate provided between the illumination lens array and the display panel in polarizing directions.

Preferably, the projection display further includes a linear polarizer provided between the color separation unit and the phase plate to transmit the specific-directional linearly polarized light only among the incident lights split from the color separation unit. More preferably, the linear polarizer comprises an S-wave polarizer that transmits the incident light if the incident light is an S-wave linearly polarized light or cuts off the incident light if the incident light is a P-wave linearly polarized light.

Preferably, the projection display further includes a polarization control unit provided between the light source and the color separation unit to convert the light from the light source to a linearly polarized light by homogenizing the light and a polarized beam splitter (PBS) provided between the linear polarizer and the display panel to transmit or reflect the incident light according to a polarized direction of the incident light from the linear polarizer. More preferably, the polarization control unit includes an integrator homogenizing the light and a polarization converter converting the homogenized light in a direction of either an S-wave or a P wave.

In another aspect of the present invention, a projection display includes a light source generating a light, a polarization control unit converting the light from the light source to a linearly polarized light by homogenizing the light, a color separation unit splitting the light into R, G and B lights from the linearly polarized light, an illumination lens array condensing the respectively split R, G and B lights, a display panel implementing an image corresponding to the incident R, G, and B lights, a first phase plate provided between the color separation unit and the illumination lens array to convert a polarized form of an incident light, a second phase plate provided between the illumination lens array and the display panel to convert the polarized form of the incident light, and a linear polarizer provided between the second phase plate and the display panel to transmit a specific-directional linearly polarized light of the incident light converted by the second phase plate.

Preferably, the first phase plate includes a λ/4 plate that converts the incident light to a right-hand circularly polarized light if the incident light is an S-wave linearly polarized light or to a left-hand circularly polarized light if the incident light is a P-wave polarized light.

Preferably, the first phase plate includes a λ/4 plate that converts the incident light to a right-hand circularly polarized light if the incident light is a P-wave linearly polarized light or to a left-hand circularly polarized light if the incident light is an S-wave polarized light.

Preferably, the linear polarizer includes a P-wave polarizer that transmits the incident light if the incident light is a P-wave linearly polarized light or cuts off the incident light if the incident light is an S-wave linearly polarized light.

Preferably, the first and second phase plates are arranged parallel or vertical to each other in polarizing directions.

In another aspect of the present invention, a projection display includes a light source generating a light, a polarization control unit converting the light from the light source to a linearly polarized light by homogenizing the light, a color separation unit splitting the light into R, G and B lights from the linearly polarized light, an illumination lens array condensing the respectively split R, G and B lights, a display panel implementing an image corresponding to the incident R, G and B lights, a first phase plate provided between the color separation unit and the illumination lens array to convert a polarized form of an incident light, a second phase plate provided between the illumination lens array and the display panel to convert the polarized form of the incident light, a first linear polarizer provided between the color separation unit and the first phase plate to transmit a specific-directional linearly polarized light of the incident light split from the color separation unit, and a second linear polarizer provided between the second phase plate and the display panel to transmit the specific-directional linearly polarized light of the incident light converted from the second phase plate.

Preferably, the first phase plate includes a λ/4 plate that converts the incident light to a right-hand circularly polarized light if the incident light is an S-wave linearly polarized light or to a left-hand circularly polarized light if the incident light is a P-wave polarized light or that converts the incident light to the right-hand circularly polarized light if the incident light is the P-wave linearly polarized light or to the left-hand circularly polarized light if the incident light is the S-wave polarized light.

Preferably, the first linear polarizer includes an S-wave polarizer that transmits the incident light if the incident light is an S-wave linearly polarized or cuts off the incident light if the incident light is a P-wave linearly polarized light and the second linear polarizer comprises a P-wave polarizer that transmits the incident light if the incident light is the P-wave linearly polarized light or cuts off the incident light if the incident light is the S-wave linearly polarized light.

Preferably, the first and second phase plates are arranged parallel or vertical to each other in polarizing directions.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, the present invention is characterized in eliminating color intrusion using a phase plate and a linearly polarizing plate. And, first and second embodiments of the present invention are described according to the numbers and arrangement methods of phase plates and linearly polarizing plates.

First Embodiment

A first embodiment of the present invention is characterized in preventing a specific color light reflected by an inner optical surface of an illumination lens array from reentering an area of another color on a display panel using a plurality of phase plates and one linear polarizer to prevent color intrusion.

Figure 4:
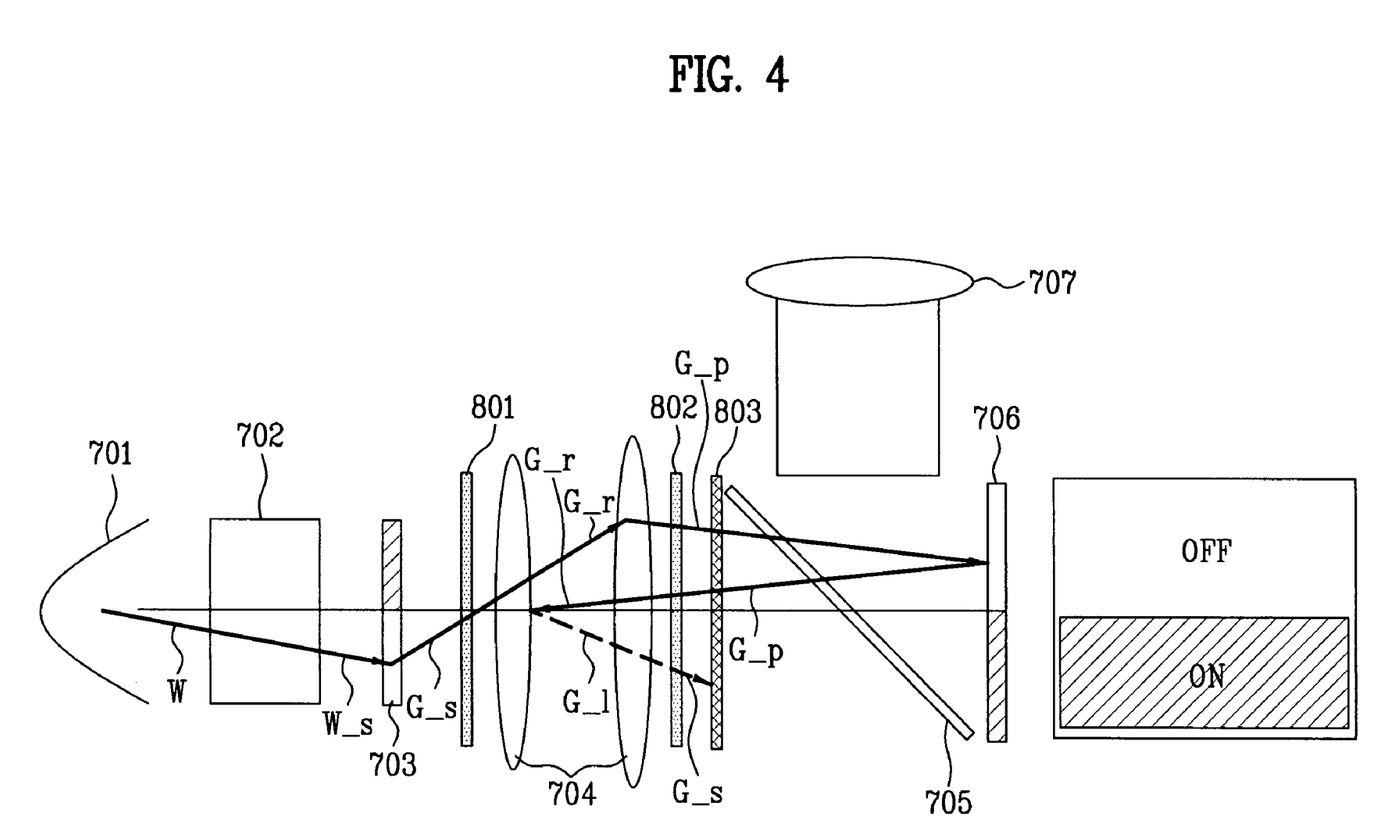
FIG. 4 is a configurational diagram of an illumination system in a single panel projection display according to a first embodiment of the present invention.

FIG. 4 is a configurational diagram of an illumination system in a single panel projection display apparatus according to a first embodiment of the present invention.

Referring to FIG. 4, an illumination system in a single panel projection display according to a first embodiment of the present invention includes a light source 701 generating non-polarized white light, a polarization control unit 702 homogenizing to convert the white light of the light source 701 to a linearly polarized light, a color separation unit 703 splitting the linearly polarized light into R, G and B lights by a color scrolling method, an illumination lens array 704 including at least one lens to condense the R, G and B lights sequentially split by the color separation unit 703, and a display panel 706 having different areas on which the R, G and B lights via the illumination lens array 704 are scrolled to be sequentially imaged thereon. And, the above-explained elements of the illumination system are aligned on the same light path. Namely, the display panel 706 scrolls R, G and B signals to cope with the incident R, G and B lights of which imaging positions are scrolled.

The polarization control unit 702 includes an integrator homogenizing the non-polarized white light and a polarizing converter converting the homogenized white light in a direction of either an S- or P-wave. In the first embodiment of the present invention, the non-polarized white light is converted to an S-wave linearly polarized light.

The color separation unit 703 can include any device for performing color separation by the color scrolling method such as a color drum, a color wheel, a rotating prism and the like.

A first phase plate 801 converting a polarized mode is arranged between the color separation unit 703 and the illumination lens array 704, and a second phase plate 802 and a linear polarizer 803 transmitting a specific polarized light are sequentially arranged between the illumination lens array 704 and a PBS 705.

A λ/4 plate converting a polarized mode to a linearly polarized light from a circularly polarized light, and vice versa, is used as each of the first and second phase plates 801 and 802.

In this case, polarizing directions of the first and second phase plates 801 and 802 can be set parallel or vertical to each other. In the first embodiment of the present invention, the polarizing directions of the first and second phase plates 801 and 802 are arranged vertical to each other for example. Specifically, the first phase plate 801 converts the S-wave linearly polarized light to a right-hand circularly polarized light and converts a P-wave linearly polarized light to a left-hand circularly polarized light. And, the second phase plate 802 converts the P-wave linearly polarized light to a right-hand circularly polarized light and converts the S-wave linearly polarized light to a left-hand circularly polarized light.

Moreover, the linear polarizer 803 is arranged to transmit the P-wave linearly polarized light only. In doing so, the linear polarizer 803 reflects or absorbs the S-wave linearly polarized light and is just capable of cutting off the S-wave linearly polarized light.

Namely, in the configuration of the illumination system according to the first embodiment of the present invention, the color separation unit 703, the first phase plate 801, the illumination lens array 704, the second phase plate 802 and the linear polarizer 803 are sequentially arranged to eliminate the color intrusion.

To implement a red color on an entire screen in the above-configured first embodiment of the present invention, an ON signal is applied to a red-light illuminated area of the display panel 706 and an OFF signal is applied to a green and blue light illuminated area of the display panel 704.

In doing so, the white light W projected from the light source 701 is homogenized by the polarization control unit 702 including the integrator and the polarizing converter and is then converted to the S-wave linearly polarized light W_s to proceed to the color separation unit 703. The color separation unit sequentially splits the white light into lights of R, G and B areas, respectively by a scrolling method.

For instance, the light having passed through a green portion of the color separation unit 703 becomes the S-wave linearly polarized light G_s of a green wavelength band and the S-wave linearly polarized green light G_s is projected on the first phase plate 801.

Once having passed through the first phase plate 801, the S-wave linearly polarized green light G_s is converted to a left-hand circularly polarized green light G_l or a right-hand circularly polarized green light G_r. In the embodiment of the present invention, the first phase plate 801 is arranged so that the S-wave linearly polarized light having passed through the first phase plate 801 is converted to the right-hand circularly polarized light.

The right-hand circularly polarized green light G_r projected from the first phase plate 801 proceeds to the second phase plate 802 via the illumination lens array 704.

The right-hand circularly polarized green light G_r is converted to a P-wave linearly polarized green light G_p by the second phase plate 802 and the converted P-wave linearly polarized green light G_p then proceeds to the linear polarizer 803.

Since the linear polarizer 803 is manufactured and arranged to transmit the P-wave linearly polarized light only, the P-wave linearly polarized green light G_p is transmitted through the linear polarizer 803 to be incident on the PBS 705.

In doing so, since the PBS 705 is manufactured and arranged to transmit the P-wave linearly polarized light and to reflect the S-wave linearly polarized light as well, the P-wave linearly polarized green light G_p is transmitted through the PBS 705 to be illuminated on a green signal area of the display panel 706. In the present invention, an ON signal is applied to a red-light illuminated area of the display panel 706 and an OFF signal is applied to a green and blue light illuminated area of the display panel 704 to implement a red color on an entire screen. Hence, a green area signal becomes an OFF state at a random moment.

This means that the green light illuminated on the green signal area of the display panel does not change its polarized direction but is reflected. Namely, the P-wave linearly polarized green light G_p maintaining its P-wave linear polarization is reflected by the green signal area to be incident on the PBS 705.

In doing so, since the red signal area is in an ON state, a P-wave linearly polarized red light is converted to an S-wave linearly polarized light in its polarized direction to be reflected to the PBS 705.

The PBS 705 transmits the P-wave linearly polarized green light G_p to the linear polarizer 803 and reflects the S-wave linearly polarized red light in a direction of the projection lens 707. Namely, the green light is unable to proceed to the projection lens 707 to fail in appearing on a screen. Since the red light is projected to the projection lens 707 only, the screen maintains an enlarged and projected red image thereon.

The linear polarizer 803 transmits the P-wave linearly polarized green light G_p, which has been transmitted through the PBS 705, to the second phase plate 802.

The P-wave linearly polarized green light G_p is converted to a right-hand circularly polarized green light G_l by the second phase plate 802 to proceed to the illumination lens array 704. And, a portion of the right-hand circularly polarized green light is reflected by a random surface of the illumination lens array 704 like a dotted line in FIG. 8. In doing so, the green light reflected by the random surface of the illumination lens arrays 704 is converted to a left-hand polarized light G_l from a right-hand polarized light G_r.

The left-hand circularly polarized green light reflected by the illumination lens array 704 proceeds to the second phase plate 802. The left-hand circularly polarized green light G_l is converted to an S-wave linearly polarized green light G_s by the second phase plate 802 to proceed to the linear polarizer 803.

Since the linear polarizer 803 is configured to cut off the S-wave linearly polarized light, the S-wave linearly polarized green light G_s is cut off by the linear polarizer 803. Hence, the green light reflected by the illumination lens array 704 is not illuminated on the red area of the display panel 706 to prevent the color intrusion. The same operation is applied to the blue light so that the blue light reflected by the illumination lens array 704 is not illuminated on the red area of the display panel 706 to prevent the color intrusion.

Alternatively, the first embodiment of the present invention can eliminate the color intrusion using the second phase plate 802 and the linear polarizer 803 without using the first phase plate 801. In this case, the costs can be lowered but light loss is generated from the linear polarizer 803.

Namely, the S-wave linearly polarized red light through the color separation unit 703 and the illumination lens array 704 is converted to the left-hand circularly polarized red light by the second phase plate 802 to proceed to the linear polarizer 803. In doing so, the circularly polarized light includes the S-wave linearly polarized light of 50% and the P-wave linearly polarized light of 50%, the P-wave linearly polarized light amounting to 50% of the left-hand circularly polarized light is transmitted through the linear polarizer 803 to proceed to the PBS 705. In doing so, since the S-wave linearly polarized light is cut off by the linear polarizer 803, 50% light loss takes place.

Hence, in the first embodiment of the present invention, a use of the first phase plate 801 is optional according to a design purpose and usage of system. For instance, in case that costs are taken into consideration only, the system is configured without using the first phase plate 801. In case that image quality is taken into consideration, i.e., in case of eliminating the color intrusion without light loss, the system is configured using the first phase plate 801. Since the object of the present invention is to enhance image quality, the first phase plate 801 is preferably used.

Second Embodiment

Figure 5:
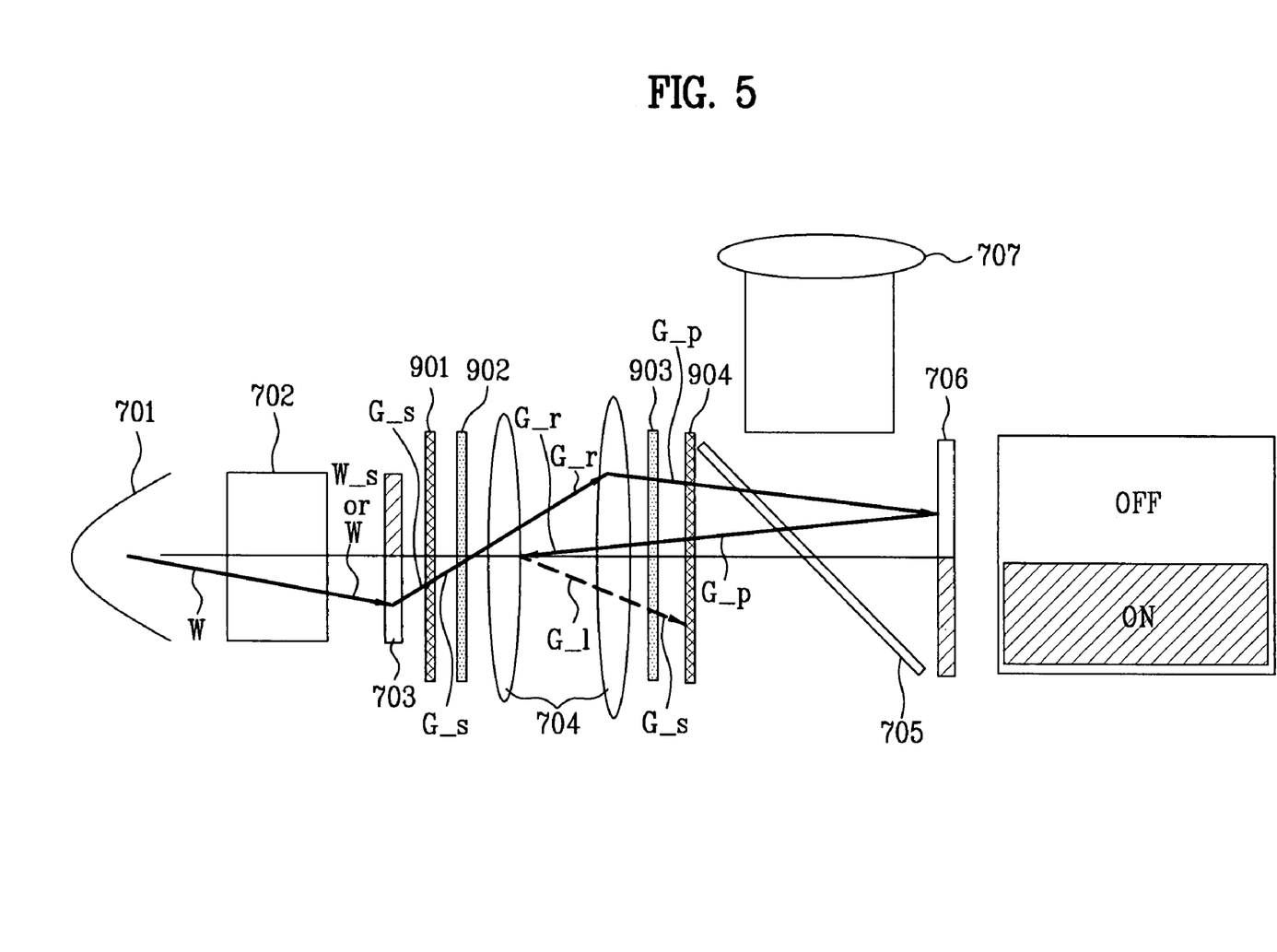
FIG. 5 is a configurational diagram of an illumination system in a single panel projection display according to a second embodiment of the present invention.

A second embodiment of the present invention is characterized in preventing a specific color light reflected by a color filter and an inner optical surface of an illumination lens array from reentering an area of another color on a display panel using a plurality of phase plates and a plurality of linear polarizers to prevent color intrusion.

FIG. 5 is a configurational diagram of an illumination system in a single panel projection display apparatus according to a second embodiment of the present invention.

Referring to FIG. 5, an illumination system in a single panel projection display according to a second embodiment of the present invention includes a light source 701, a polarization control unit 702, a color separation unit 703, an illumination lens array 704, and a display panel 706. And, the above-explained elements of the illumination system are aligned on the same light path like those in FIG. 4. Yet, they can be modified as well.

In FIG. 5, a first linear polarizer 901 transmitting a specific polarized light only and a first phase plate 902 converting a polarized mode are sequentially arranged between the color separation unit 703 and the illumination lens array 704. And, a second phase plate 903 and a second linear polarizer 904 are sequentially arranged between the illumination lens array 704 and a PBS 705.

A λ/4 plate converting a linearly polarized light from a circularly polarized light in a polarized mode, and vice versa, is used as each of the first and second phase plates 902 and 903. In this case, polarizing directions of the first and second phase plates 902 and 903 can be set parallel or vertical to each other. In the second embodiment of the present invention, the polarizing directions of the first and second phase plates 902 and 903 are arranged vertical to each other for example. Specifically, the first phase plate 902 converts an S-wave linearly polarized light to a right-hand circularly polarized light and converts a P-wave linearly polarized light to a left-hand circularly polarized light. And, the second phase plate 903 converts the P-wave linearly polarized light to a right-hand circularly polarized light and converts the S-wave linearly polarized light to a left-hand circularly polarized light.

Moreover, an S-wave linear polarizer transmitting an S-wave linearly polarized light only is used as the first linear polarizer 901. And, a P-wave linear polarizer transmitting a P-wave linearly polarized light only is used as the second linear polarizer 904. Namely, the first linear polarizer 901 cuts off the P-wave linearly polarized light and the second linear polarizer cuts off the S-wave linearly polarized light.

Namely, to eliminate the color intrusion in the configuration of the illumination system according to the second embodiment of the present invention, the color separation unit 703, the first linear polarizer 901, the first phase plate 902, the illumination lens array 704, the second phase plate 903 and the second linear polarizer 904 are sequentially arranged.

In the above-configured second embodiment of the present invention, it is assumed that an ON signal is applied to a red-light illuminated area of the display panel 706 and that an OFF signal is applied to a green and blue light illuminated area of the display panel 704 to implement a red color on an entire screen.

In doing so, the white light W projected from the light source 701 is homogenized by the polarization control unit 702 including an integrator and polarizing converter and is then converted to the S-wave linearly polarized light W_s to proceed to the color separation unit 703. The color separation unit sequentially splits the white light into lights of R, G and B areas, respectively by a scrolling method.

For instance, the light having passed through a green portion of the color separation unit 703 becomes the S-wave linearly polarized light G_s of a green wavelength band and the S-wave linearly polarized green light G_s is then transmitted through the first linear polarizer 901 to proceed to the first phase plate 902.

Once having passed through the first phase plate 902, the S-wave linearly polarized green light G_s is converted to a left-hand circularly polarized green light G_l or a right-hand circularly polarized green light G_r. In the embodiment of the present invention, the first phase plate 902 is arranged so that the S-wave linearly polarized light having passed through the first phase plate 902 is converted to the right-hand circularly polarized light.

The right-hand circularly polarized green light G_r projected from the first phase plate 902 proceeds to the second phase plate 903 via the illumination lens array 704.

The right-hand circularly polarized green light G_r is converted to a P-wave linearly polarized green light G_p by the second phase plate 903 and the converted P-wave linearly polarized green light G_p then proceeds to the second linear polarizer 904.

Since the second linear polarizer 904 is the P-wave polarizer, the P-wave linearly polarized green light G_p is transmitted through the second linear polarizer 904 to be incident on the PBS 705.

In doing so, since the PBS 705 is manufactured and arranged to transmit the P-wave linearly polarized light and to reflect the S-wave linearly polarized light, the P-wave linearly polarized green light G_p is transmitted through the PBS 705 to be illuminated on a green signal area of the display panel 706. In the present invention, an ON signal is applied to a red-light illuminated area of the display panel 706 and an OFF signal is applied to a green and blue light illuminated area of the display panel 704 to implement a red color on an entire screen. Hence, a green area signal becomes an OFF state at a random moment.

This means that the green light illuminated on the green signal area of the display panel does not change its polarized direction but is reflected. Namely, the P-wave linearly polarized green light G_p maintaining its P-wave linear polarization is reflected by the green signal area to be incident on the PBS 705.

In doing so, since the red signal area is in an ON state, a P-wave linearly polarized red light changes its polarized direction into S-wave linear polarization to be reflected to the PBS 705.

The PBS 705 transmits the P-wave linearly polarized green light G_p to the second linear polarizer 904 and reflects the S-wave linearly polarized red light in a direction of the projection lens 707. Namely, the green light is unable to proceed to the projection lens 707 to fail in appearing on a screen. Since the red light is projected to the projection lens 707 only, the screen maintains an enlarged and projected red image thereon.

The second linear polarizer 904 transmits the P-wave linearly polarized green light G_p, which has been transmitted through the PBS 705, to the second phase plate 903.

The P-wave linearly polarized green light G_p is converted to a right-hand circularly polarized green light G_l by the second phase plate 903 to proceed to the illumination lens array 704. And, a portion of the right-hand circularly polarized green light is reflected by a random surface of the illumination lens array 704 like a dotted line in FIG. 5. In doing so, the green light reflected by the random surface of the illumination lens arrays 704 is converted to a left-hand polarized light G_l from a right-hand polarized light G_r.

The left-hand circularly polarized green light reflected by the illumination lens array 704 proceeds to the second phase plate 903. The left-hand circularly polarized green light G_l is converted to an S-wave linearly polarized green light G_s by the second phase plate 903 to proceed to the second linear polarizer 904.

Since the second linear polarizer 904 is configured to cut off the S-wave linearly polarized light, the S-wave linearly polarized green light G_s is cut off by the second linear polarizer 904. Hence, the green light reflected by the illumination lens array 704 is not illuminated on the red area of the display panel 706 to prevent the color intrusion. The same operation is applied to the blue light so that the blue light reflected by the illumination lens array 704 is not illuminated on the red area of the display panel 706 to prevent the color intrusion.

Meanwhile, the right-hand circularly polarized green light G_p transmitted through the illumination lens array 704 without being reflected by the random surface of the illumination lens array 704 is converted to an S-wave linearly polarized green light G_s to proceed to the first linear polarizer 901. Since the first linear polarizer 901 is the S-wave linear polarizer, the S-wave linearly polarized light G_s proceeds to the color separation unit 703. And, a portion of the S-wave linearly polarized green light is reflected by the color separation unit 703 to proceed to the first linear polarizer 901. In this case, since the green light reflected by the color separation unit 704 is the linearly polarized light converted from the S-wave to the P-wave, the P-wave linearly polarized green light G_p is cut off by the first linear polarizer 901 that is the S-wave polarizer.

Hence, the second embodiment of the present invention prevents the color intrusion of the green light reflected by the color separation unit 703 as well as the color intrusion of the green light reflected by the illumination lens array 704. The same operation is applied to the blue light so that the blue light reflected by the illumination lens array 704 is not illuminated on the red area of the display panel 706 to prevent the color intrusion.

In the present invention, more applications of the number and arrangement of the phase plates and linear polarizers can be widely modified. Hence, the present invention is not limited to the aforesaid first and second embodiments.

By the projection display according to the present invention, the reflective light on the internal optical surface of the optical system can be eliminated using the phase plate and linear polarizer in the color sequential driving of illuminating at least two colors on the single display panel at a random moment. Therefore, the present invention prevents the degradation of color purity generated from the mutual intrusion of light of at least two colors, thereby enhancing quality of color image.

Meanwhile, the terminologies used in the description of the present invention are defined to take the functions in the present invention into consideration and may vary according to intentions or conventions of those skilled in the art. Hence, the definitions of the terminologies should be made based on the overall contents of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A projection display, comprising:
   a light source configured to generate a light;
   a color separation unit configured to split the light into R, G and B lights, wherein the color separation unit comprises one of a color drum and a rotational prism;
   an illumination lens array configured to condense the R, G and B lights;
   a display panel configured to display an image corresponding to the R, G and B lights respectively;
   a phase plate device including at least one of a first phase plate provided between the color separation unit and the illumination lens array and a second phase plate provided between the illumination lens array and the display panel, the phase plate device configured to convert a polarized form of an incident light; and
   a first linear polarizer provided between the phase plate device and the display panel and configured to transmit a specific-directional linearly polarized light of the incident light converted by the phase plate device,
   wherein the phase plate device is configured to circularly polarize the incident light if the incident light is linearly polarized or to linearly polarize the incident light if the incident light is circularly polarized.

2. The projection display of claim 1, wherein the phase plate device comprises a $\lambda/4$ plate.

3. The projection display of claim 1, wherein the first phase plate is provided between the color separation unit and the illumination lens arrays and is configured to right-hand circularly polarize the incident light if the incident light is S-wave linearly polarized or to left-hand circularly polarize the incident light if the incident light is P-wave linearly polarized.

4. The projection display of claim 1, wherein the second phase plate is provided between the illumination lens array and the display panel and is configured to right-hand circularly polarize the incident light if the incident light is P-wave linearly polarized or to left-hand circularly polarize the incident light if the incident light is S-wave linearly polarized.

5. The projection display of claim 1, wherein the first linear polarizer comprises a P-wave polarizer configured to transmit the incident light if the incident light is a P-wave linearly polarized light or to cut off the incident light if the incident light is an S-wave linearly polarized light.

6. The projection display of claim 1, wherein the first phase plate is provided between the color separation unit and the illumination lens array and is arranged parallel to the second phase plate which is provided between the illumination lens array and the display panel in polarizing directions.

7. The projection display of claim 1, further comprising:
   a second linear polarizer provided between the color separation unit and the phase plate device and configured to transmit the specific-directional linearly polarized light only among incident lights split from the color separation unit.

8. The projection display of claim 7, wherein the second linear polarizer comprises an S-wave polarizer configured to transmit the incident light if the incident light is an S-wave linearly polarized light or to cut off the incident light if the incident light is a P-wave linearly polarized light.

9. The projection display of claim 1, further comprising:
   a polarization control unit provided between the light source and the color separation unit and configured to convert the light from the light source to a linearly polarized light by homogenizing the light; and
   a polarized beam splitter (PBS) provided between the first linear polarizer and the display panel and configured to transmit or reflect the incident light according to a polarized direction of the incident light from the first linear polarizer.

10. The projection display of claim 9, the polarization control unit comprising:

an integrator configured to homogenize the light; and a polarization converter configured to convert the homogenized light in a direction of either an S-wave or a P wave.

11. A projection display, comprising:

a light source configured to generate a light;

a polarization control unit configured to generate the light from the light source to a linearly polarized light by homogenizing the light;

a color separation unit configured to split the light into R, G and B lights from the linearly polarized light, wherein the color separation unit comprises one of a color drum and a rotational prism;

an illumination lens array comprising plural lenses configured to condense the split R, G and B lights;

a display panel configured to display an image corresponding to the R, G and B lights;

a first phase plate provided between the color separation unit and the illumination lens array and configured to convert a polarized form of an incident light;

a second phase plate provided between the illumination lens array and the display panel and configured to convert the polarized form of the incident light; and a linear polarizer provided between the second phase plate and the display panel and configured to transmit a specific-directional linearly polarized light of the incident light converted by the second phase plate, wherein at least one of the plural lenses is provided between the first phase plate and the second phase plate.

12. The projection display of claim 11, wherein the first phase plate comprises a λ/4 plate configured to right-hand circularly polarize the incident light if the incident light is S-wave linearly polarized or to left-hand circularly polarize the incident light if the incident light is P-wave linearly polarized.

13. The projection display of claim 11, wherein the first phase plate comprises a λ/4 plate configured to right-hand circularly polarize the incident light if the incident light is P-wave linearly polarized or to left-hand circularly polarize the incident light if the incident light is S-wave linearly polarized.

14. The projection display of claim 11, wherein the linear polarizer comprises:

a P-wave polarizer configured to transmit the incident light if the incident light is a P-wave linearly polarized light or to cut off the incident light if the incident light is an S-wave linearly polarized light.

15. The projection display of claim 11, wherein the first and second phase plates are arranged parallel to each other in polarizing directions.

16. A projection display, comprising:

a light source configured to generate a light;

a polarization control unit configured to convert the light from the light source to a linearly polarized light by homogenizing the light;

a color separation unit configured to split the light into R, G and B lights from the linearly polarized light, wherein the color separation unit comprises one of a color drum, a color wheel and a rotational prism;

an illumination lens array configured to condense the split R, G and B lights;

a display panel configured to display an image corresponding to the R, G and B lights;

a first phase plate provided between the color separation unit and the illumination lens array and configured to convert a polarized form of an incident light;

a second phase plate provided between the illumination lens array and the display panel and configured to convert the polarized form of the incident light;

a first linear polarizer provided between the color separation unit and the first phase plate and configured to transmit a specific-directional linearly polarized light of the incident light split from the color separation unit; and a second linear polarizer provided between the second phase plate and the display panel and configured to transmit the specific-directional linearly polarized light of the incident light converted from the second phase plate, wherein at least one of the first and second phase plate is provided between the first linear polarizer and the second linear polarizer.

17. The projection display of claim 16, wherein the first phase plate comprises one of:

a λ/4 plate configured to right-hand circularly polarize the incident light if the incident light is S-wave linearly polarized or to left-hand circularly polarize the incident light if the incident light is P-wave linearly polarized, and a λ/4 plate configured to right-hand circularly polarize the incident light if the incident light is P-wave linearly polarized or to left-hand circularly polarize the incident light if the incident light is S-wave linearly polarized.

18. The projection display of claim 16, wherein the first linear polarizer comprises an S-wave polarizer configured to transmit the incident light if the incident light is an S-wave linearly polarized light or to cut off the incident light if the incident light is a P-wave linearly polarized light, and wherein the second linear polarizer comprises a P-wave polarizer configured to transmit the incident light if the incident light is the P-wave linearly polarized light or to cut off the incident light if the incident light is the S-wave linearly polarized light.

19. The projection display of claim 16, wherein the first and second phase plates are arranged parallel to each other in polarizing directions.

* * * * *